United States Patent
Zou et al.

(10) Patent No.: US 12,316,444 B2
(45) Date of Patent: May 27, 2025

(54) AUTONOMOUS PARAMETER-VARYING COMMUNICATION SYNCHRONIZATION METHOD AND SYSTEM BASED ON EXTERNAL CLOCK

(71) Applicant: Nanjing University of Posts and Telecommunications, Suzhou (CN)

(72) Inventors: Yulong Zou, Suzhou (CN); Zimu Fang, Suzhou (CN); Zhixian Lin, Suzhou (CN); Zhongmiao Chu, Suzhou (CN)

(73) Assignee: Nanjing University of Posts and Telecommunications, Jiangsu (CN)

( * ) Notice: Subject to any disclaimer, the term of this patent is extended or adjusted under 35 U.S.C. 154(b) by 0 days.

(21) Appl. No.: 18/724,621

(22) PCT Filed: Nov. 14, 2023

(86) PCT No.: PCT/CN2023/131388
§ 371 (c)(1),
(2) Date: Jun. 27, 2024

(87) PCT Pub. No.: WO2024/104309
PCT Pub. Date: May 23, 2024

(65) Prior Publication Data
US 2025/0062849 A1    Feb. 20, 2025

(30) Foreign Application Priority Data
Jul. 3, 2023    (CN) .......................... 202310802058.7

(51) Int. Cl.
*H04J 3/06*    (2006.01)
*H04B 1/715*    (2011.01)
(Continued)

(52) U.S. Cl.
CPC ............ *H04J 3/0667* (2013.01); *H04B 1/715* (2013.01); *H04B 1/7156* (2013.01);
(Continued)

(58) Field of Classification Search
CPC ...... H04J 3/0638; H04J 3/0661; H04J 3/0667; H04J 3/0685; H04B 2001/7154;
(Continued)

(56) References Cited

U.S. PATENT DOCUMENTS

2009/0003413 A1*    1/2009    Jang ................. H04B 1/715
                                                                         375/135
2019/0356466 A1*    11/2019    Kratz .................. H04J 3/0682
(Continued)

FOREIGN PATENT DOCUMENTS

CN            103178917            6/2013
CN            112039719            12/2020
(Continued)

OTHER PUBLICATIONS

Tacket et al "An Implementation of Time Synchronization in Low-Power Wireless Sensor Networks" IEEE, 2011 (Year: 2011).*
(Continued)

*Primary Examiner* — Omer S Mian
(74) *Attorney, Agent, or Firm* — JCIPRNET

(57) ABSTRACT

The present invention are an autonomous parameter change communication synchronization method and system based on an external clock. The method comprises: firstly, two communication parties acquiring the same external clock source signal, and each correcting a local time according to the external clock source signal; secondly, a communication caller autonomously establishing a bidirectional communication link with a communication responder by means of a call response mechanism; then the two communication parties entering an autonomous parameter change commu-
(Continued)

nication stage, and changing respective system sending and receiving parameters according to synchronous clock; and at the same time, the two communication parties each performing comparison to determine a time difference value at a parameter change moment in real time, and each correcting a local clock when the difference value is greater than a preset threshold value, thereby maintaining the consistency of the local clocks of the two parties.

16 Claims, 3 Drawing Sheets

(51) Int. Cl.
    *H04B 1/7156* (2011.01)
    *H04W 56/00* (2009.01)
(52) U.S. Cl.
    CPC .......... *H04J 3/0644* (2013.01); *H04W 56/00* (2013.01); *H04W 56/0035* (2013.01)
(58) Field of Classification Search
    CPC .......... H04B 2201/71323; H04B 1/715; H04B 1/7156; H04W 56/0035; H04W 56/00; Y02D 30/70

See application file for complete search history.

(56) References Cited

U.S. PATENT DOCUMENTS

2021/0076390 A1   3/2021  Zou et al.
2024/0267863 A1*  8/2024  Hong .................... H04W 56/00

FOREIGN PATENT DOCUMENTS

| CN | 112994739 | 6/2021 |
| CN | 116527078 | 8/2023 |

OTHER PUBLICATIONS

Zhongliang et al, "Research on Time Synchronization Algorithm Based on Co-band Signal" IEEE, 2023 (Year: 2023).*
"International Search Report (Form PCT/ISA/210) of PCT/CN2023/131388", mailed on Mar. 27, 2024, with English translation thereof, pp. 1-4.

* cited by examiner

```
┌─────────────────────────────────────────────────────────────────────────┐
│ Two communication parties obtain a signal of a same external clock source, │
│ and give the signal to respective device timestamps to synchronize local clocks │
│ of the two parties.                                                      │
└─────────────────────────────────────────────────────────────────────────┘
                                    │
┌─────────────────────────────────────────────────────────────────────────┐
│ Based on synchronous clocks, the two communication parties autonomously  │
│ establish a two-way communication link without a common control channel. │
└─────────────────────────────────────────────────────────────────────────┘
                                    │
┌─────────────────────────────────────────────────────────────────────────┐
│ Based on synchronous clocks, the two communication parties perform       │
│ parameter-varying transmitting and receiving.                            │
└─────────────────────────────────────────────────────────────────────────┘
                                    │
┌─────────────────────────────────────────────────────────────────────────┐
│ The two communication parties perform interference detection on a receiving │
│ frequency point through a receiving verification mechanism, and determine │
│ whether a received data packet is valid.                                 │
└─────────────────────────────────────────────────────────────────────────┘
                                    │
┌─────────────────────────────────────────────────────────────────────────┐
│ The two communication parties measure the synchronization error by      │
│ comparing a difference value at the parameter-varying time, and determine │
│ whether to correct the synchronous clocks in real time.                 │
└─────────────────────────────────────────────────────────────────────────┘

Autonomous parameter-varying communication
                    synchronization method and system based on
                    external clock
```

FIG. 1

AUTONOMOUS PARAMETER-VARYING COMMUNICATION SYNCHRONIZATION METHOD AND SYSTEM BASED ON EXTERNAL CLOCK

CROSS-REFERENCE TO RELATED APPLICATION

This application is a 371 of international application of PCT application serial no. PCT/CN2023/131388, filed on Nov. 14, 2023, which claims the priority benefit of China application serial no. 202310802058.7, filed on Jul. 3, 2023. The entirety of each of the above-mentioned patent applications is hereby incorporated by reference herein and made a part of this specification.

TECHNICAL FIELD

The present invention belongs to the technical field of wireless communication, and particularly, relates to an autonomous parameter-varying communication synchronization method and system based on an external clock.

BACKGROUND

A cognitive frequency-hopping system organically combines a spectrum allocation result with frequency-hopping communication based on spectrum sensing technology. The system adjusts transmission parameters in real time in the transmission process, so that the transmission scheme of the system can adapt to the change of the external environment. After cognitive frequency hopping is introduced into a cognitive unit, the next frame of frequency table and communication strategy are updated by adjusting the transmission strategy, and interference can be avoided, so the anti-interference ability of the system can be improved. However, the cognitive frequency-hopping technology, as one of the common cognitive anti-interference technologies, only targets the change of a single signal feature parameter at a frequency point, and gradually cannot meet the requirement of the anti-interference performance.

Two communication parties need to perceive and adapt to the complex electromagnetic environment to vary various signal feature parameters (parameter-varying), thereby improving the anti-interference performance. For the traditional system using local clocks for synchronization, due to the difference and the error accumulation of the local clocks, it is difficult to cope with the situations of a long communication time, a short parameter-varying duration, and a high synchronization requirement. When the two parties cannot be synchronized accurately, the packet loss rate will be increased, and communication interruption will be caused in severe cases. In addition, when a parameter-varying communication system performs parameter-varying communication between the two parties based on the local device clocks, the time errors between the two parties will gradually accumulate. Therefore, there is a need to propose a parameter-varying synchronization method based on an external clock to reduce the synchronization error of the two communication parties, eliminate the long-term accumulation of errors and make up the defects of the autonomous parameter-varying communication system in terms of synchronization, thereby improving the anti-interference performance of the system.

SUMMARY

The technical problem to be solved by the present invention is to provide an autonomous parameter-varying communication synchronization method and system based on an external clock. A two-way communication link is autonomously established by two communication parties to perform parameter-varying transmitting and receiving, and interference detection is performed on a receiving frequency point to complete the correction or maintenance of clocks, thereby reducing the synchronization error of the two communication parties, eliminating the long-term accumulation of errors, and improving the anti-interference performance of the system.

To solve the above technical problem, the present invention adopts the following technical solutions:

an autonomous parameter-varying communication synchronization method based on an external clock provided by the present invention includes the following steps:

S1: obtaining, by two communication parties, a signal of a same external clock source, and giving the signal to respective device timestamps to synchronize local clocks of the two communication parties;

S2: based on synchronous clocks, autonomously establishing, by the two communication parties, a two-way communication link;

S3: based on synchronous clocks, performing parameter-varying transmitting and receiving by the two communication parties;

S4: performing, by the two communication parties, interference detection on a receiving frequency point through a receiving verification mechanism, and determining the validity of a received data packet; and S5: calculating, respectively by the two communication parties, a difference value between a local receiving time of the own party and a parameter-varying transmitting time of the other party, correcting the local clock if the difference value is greater than a preset threshold, and maintaining the current synchronous clock if the difference value is less than the preset threshold.

Further, transmission data packet fields transmitted by the two communication parties include: caller ID CID, responder ID RID, parameter-varying transmitting time TIME, wait duration WAIT, parameter-varying duration DUR, transmitted data DATA and feature parameter set NTFS.

The caller ID CID and the responder ID RID are used for verifying the identities of the two communication parties.

The parameter-varying time TIME is a parameter-varying transmitting time and used for correcting the synchronous clocks of the two parties.

The wait duration WAIT is a link-establishing wait duration, determined by the responder, and used for the two communication parties to determine a parameter-varying communication starting time.

The parameter-varying duration DUR is a wait duration for the next parameter variation and used for the two communication parties to realize synchronization of autonomous parameter-varying communication.

The transmitted data DATA is information content to be transmitted between the two communication parties.

The feature parameter set NTFS is used for autonomously varying signal feature parameters, including feature parameters of frequency point, bandwidth, waveform, and modulation mode of a signal, and freely combining the feature parameters according to requirements.

Further, in step S1, the two communication parties obtain a signal of an external clock source and give the signal to respective device timestamps to initialize clock synchronization; at this time, the local clock serves as a synchronous clock for the two communication parties to use, and the synchronous clock will be clocked locally; the synchronous clocks of the two communication parties will remain highly consistent and have the function of real-time correction; and the two communication parties autonomously establish the two-way link and vary the system parameters both based on the synchronous clocks.

Further, in step S2, the specific steps of establishing the two-way communication link are as follows:

S201: autonomously generating, by the caller, feature parameter sets NTFSct and NTFScr through spectrum sensing, where the NTFSct is taken as a feature parameter set of a caller transmitted signal, setting parameters of the transmitted signal; and packaging the feature parameter set NTFScr and transmitting time TIMEct into a data packet for transmitting.

S202: autonomously identifying, by the responder, the feature parameter set NTFSct through spectrum sensing, receiving the data packet including the feature parameter set NTFScr and the transmitting time TIMEct in a matching manner, parsing the received data packet to obtain the feature parameter set NTFScr and use the same as a feature parameter set of a responder transmitted signal and a transmitted signal feature parameter set at the parameter-varying communication starting time; and meanwhile, autonomously generating, by the responder, a feature parameter set NTFSrr through spectrum sensing, and taking the NTFSrr as a feature parameter set of a responder received signal.

S203: packaging, by the responder, the feature parameter set NTFSrr, the transmitting time TIMErt and the wait duration WAIT into a data packet for transmitting; and determining, by the responder, transmitted signal parameters at the parameter-varying communication starting time according to NTFScr, and determining received signal parameters at the parameter-varying communication starting time according to the feature parameter set NTFSrr.

S204: receiving, by the caller, the data packet in step S203 according to the feature parameter set NTFScr, and parsing the same to obtain the feature parameter set NTFSrr, the transmitting time TIMErt of the responder and the wait duration WAIT; and determining, by the caller, transmitted signal parameters at the parameter-varying communication starting time according to the NTFSrr, and determining received signal parameters at the parameter-varying communication starting time according to the feature parameter set NTFScr.

S205: determining, by the two communication parties, the parameter-varying communication starting time TIMEs according to TIMEr and WAIT, where the time is the sum of TIMEr and WAIT; and taking TIMEs, by the two communication parties, as the parameter-varying communication starting time of a transmitter and a receiver, whereby the link establishment between the two communication parties is completed.

Further, in step S3, the specific steps of performing parameter-varying transmitting and receiving by the two communication parties are as follows:

S301: packaging, by the two communication parties, the current parameter-varying time of the transmitter of the own party, the parameter-varying duration of the receiver and the feature parameter set of the received signal into a data packet for transmitting, for use by the two parties in parameter variation.

S302: for parameter-varying communication, dynamically updating NTFs for autonomously varying parameters, where the parameters of the caller transmitted signal and the parameters of the responder received signal at the parameter-varying communication starting time are NTFSrr generated in the link establishing process, and the parameters of the caller received signal and the parameters of the responder transmitted signal at the parameter-varying communication starting time are NTFScr generated in the link establishing process; autonomously generating, by the two communication parties, a received signal feature parameter set NTFS of the own party at the next parameter-varying time through spectrum sensing, updating, by the other party, a transmitted signal feature parameter set at the next parameter-varying time according to the NTFS, and converting, by the two communication parties, the system parameters based on the signal feature parameter set.

S303: for the $i^{th}$ (i=0,1,2, . . . ,N) transmitter parameter variation by the two communication parties, recording, by the transmitter of the own party, the current parameter-varying time as TIMEt(i); calculating the next parameter-varying time of the transmitter of the own party according to the parameter-varying duration DURt(i) in the received data packet, with the specific equation as follows:

$$TIMEt(i+1) = TIMEt(i) + DURt(i),$$

where TIMEt(0) indicates the parameter-varying communication starting time of the transmitter of the own party, and the value is TIMEs in step S205; similarly, for the $j^{th}$ (j=0,1,2, . . . ,N) receiver parameter variation by the two communication parties, recording, by the receiver of the own party, the current parameter-varying time as TIMEr(j); and calculating the next parameter-varying time of the receiver of the own party according to the parameter-varying duration DURr(j) in the transmitted data packet, with the specific equation as follows:

$$TIMEr(j+1) = TIMEr(j) + DURr(j),$$

where TIMEr(0) indicates the parameter-varying communication starting time of the receiver of the own party, and the value is TIMEs in step S205, so that the two communication parties perform synchronous parameter-varying communication at the same parameter-varying time.

Further, the specific content of step S4 is as follows: performing receiving verification many times in succession according to CID in the received data packet, that is, receiving and parsing the received data packet, and determining whether the CID in the data packet is equal to the RID set locally; if so, determining the received data packet as a valid data packet, and entering step S5; and otherwise, indicating that no valid data packets are received in all the receiving verification many times, determining that there is interference at the current receiving frequency point, and returning to step S2 to re-establish a two-way communication link.

Further, in step S5, the specific content of correcting the synchronous clock in real time is as follows: recording the local receiving time of the data packet of the other party every time the receivers of the two communication parties vary parameters, parsing the received data packet to obtain the parameter-varying transmitting time of the other party, and calculating a difference value between the local receiving time of the own party and the parameter-varying transmitting time of the other party; if the difference value is greater than a preset threshold, correcting the local clock according to the external clock signal; and if the difference value is less than the preset threshold, maintaining the current synchronous clock. After step S5 is completed, return to step S3 to perform a parameter-varying communication again. The setting of the preset threshold depends on the software and hardware conditions and the operating environment of the autonomous parameter-varying communication system.

Further, the present invention also provides an autonomous parameter-varying communication synchronization system based on an external clock, including:
- a local clock synchronization module, configured to obtain, by two communication parties, a signal of a same external clock source, and give the signal to respective device timestamps to synchronize local clocks of the two communication parties;
- a two-way communication link establishing module, configured to: based on synchronous clocks, autonomously establish, by the two communication parties, a two-way communication link;
- a parameter-varying transmitting and receiving module, configured to: based on synchronous clocks, perform parameter-varying transmitting and receiving by the two communication parties;
- an interference detection module, configured to: perform, by the two communication parties, interference detection on a receiving frequency point through a receiving verification mechanism, and determine the validity of a received data packet; and
- a clock correcting or maintaining module, configured to: compare, respectively by the two communication parties, a difference value between a local receiving time of the own party and a parameter-varying transmitting time of the other party, correct the local clock if the difference value is greater than a preset threshold, and maintain the current synchronous clock if the difference value is less than the preset threshold.

Further, the present invention also provides an electronic device, including a memory, a processor, and a computer program stored in the memory and executable on the processor, the computer program configured to, when executed by the processor, implement the steps of the autonomous parameter-varying communication synchronization method based on an external clock as described above.

Further, the present invention also provides a computer-readable storage medium storing a computer program, the computer program configured to, when executed by the processor, implement the steps of the autonomous parameter-varying communication synchronization method based on an external clock as described above.

BRIEF DESCRIPTION OF THE DRAWINGS

FIG. 1 is a schematic diagram of overall implementation of the method of according to the present invention.

DETAILED DESCRIPTION OF THE INVENTION

The present invention is further described below in detail with reference to the accompanying drawings and specific embodiments.

Figure 2:
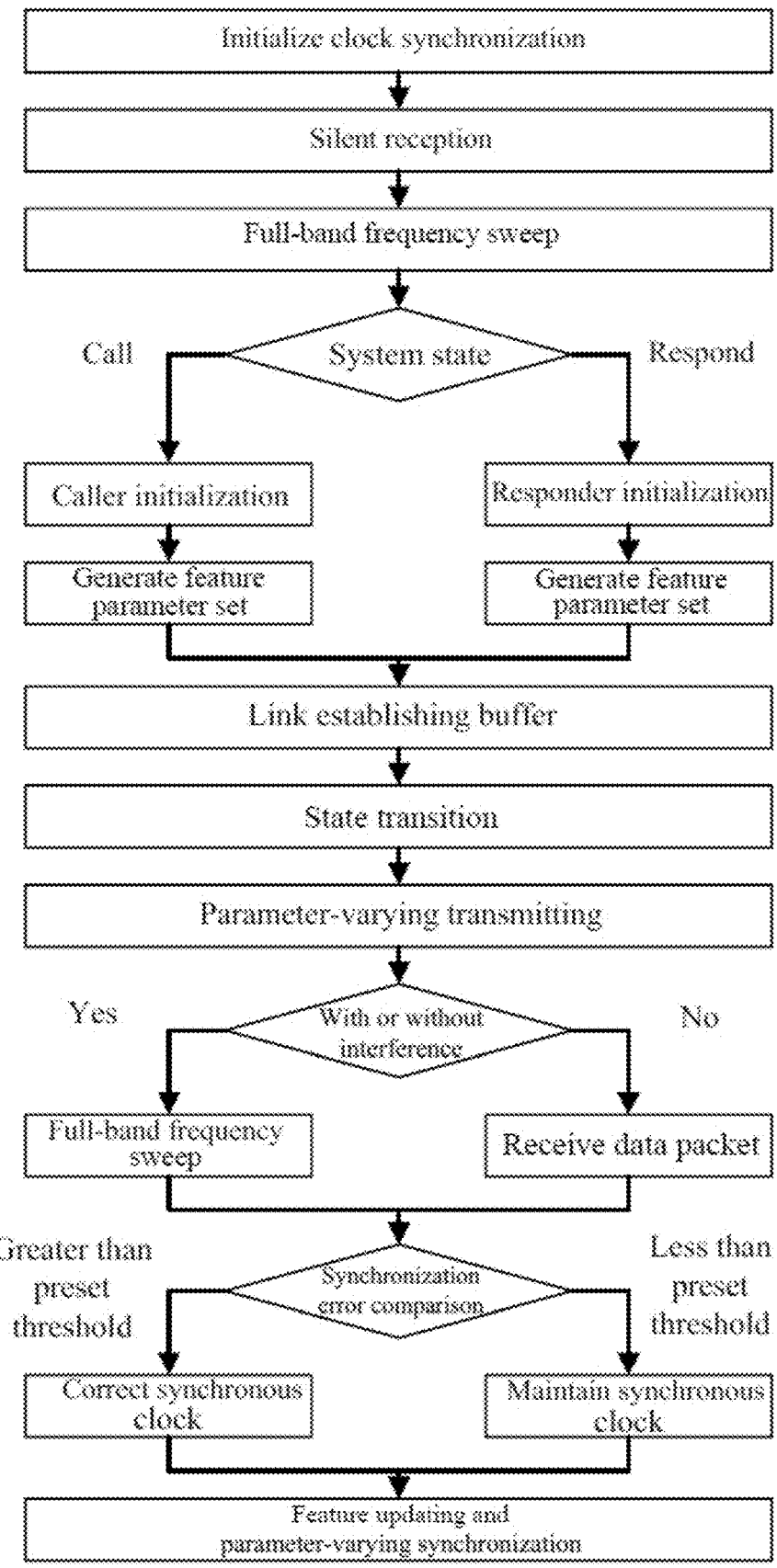
FIG. 2 is a flow block diagram of specific communication between a communication caller and a communication responder according to an embodiment of the present invention.

To achieve the above objectives, the present invention provides an autonomous parameter-varying communication synchronization method based on an external clock. The method is applied to a wireless communication system composed of a plurality of communication nodes and potential interference nodes. The whole communication flow of the system includes a user call-respond autonomous link establishment process and a real-time autonomous parameter-varying anti-interference process. The specific contents are shown in FIG. 1 and FIG. 2, including:
- each node of the system is in a state of full-band frequency sweep silent reception of an unlocked GPS signal by default, the caller autonomously selects the feature parameter set according to the real-time state of a wireless spectrum environment, the responder autonomously identifies the feature parameter set of the signal through full-band sensing for matching reception, and the two communication parties autonomously establish a link through a calling and responding mechanism.
- S1: the two communication parties use a GPS signal receiving antenna to lock a GPS signal, add one second to the obtained GPS time at the rising edge time of a PPS signal, and give a device timestamp at the rising edge time of the next PPS signal to complete one correction of the synchronous clocks of the two communication parties. At this time, the local clock serves as a synchronous clock for the two communication parties to use, and the synchronous clock will be clocked locally; the synchronous clocks of the two communication parties will remain highly consistent and have the function of real-time correction; and the two communication parties autonomously establish the two-way link and vary the system parameters both based on the synchronous clocks.

In the communication process, data packets are transmitted or received between communication nodes. The fields of the data packet include: caller ID CID, responder ID RID, parameter-varying time TIME, wait duration WAIT, parameter-varying duration DUR, transmitted data DATA and feature parameter set NTFS, where
- the caller ID CID and the responder ID RID are used for verifying the identities of the two communication parties;
- the parameter-varying time TIME is a parameter-varying transmitting time and used for correcting the synchronous clocks of the two parties;
- the wait duration WAIT is a link-establishing wait duration and used for the two communication parties to determine a parameter-varying communication starting time;
- the parameter-varying duration DUR is a wait duration for the next parameter variation and used for the two communication parties to realize synchronization of autonomous parameter-varying communication;
- the transmitted data DATA is information content to be transmitted between the two communication parties; and
- the feature parameter set NTFS is used for autonomously varying signal feature parameters, including feature parameters of frequency point, bandwidth, waveform, and modulation mode of a signal, and freely combining the feature parameters according to system requirements.

S2: the two communication parties autonomously establish a two-way communication link based on synchronous clocks to perform parameter-varying transmitting and receiving, including the specific steps:

S201: silent reception: the communication system enters an initialization silent reception procedure when starting; by default, all communication nodes are in the silent reception state after startup, and in this state, full-band frequency sweep (CHa) is performed in the frequency point range [800 MHZ,820 MHz] set by the system, and once autonomous identification indicates that there are data packets sent by other valid users through full-band sensing, or the state of the system changes to a call initiation state (dialing paging), it proceeds to the next call initiation step.

S202: call initiation: when a user presses a transmitting key of a communication node to change the system state to the call initiation state, the communication node is taken as the caller, where for the caller, the CID is set to 100 and the RID is set to 200; the caller performs fast spectrum sensing on spectra within the frequency band range [800 MHZ, 820 MHz] set by the system to obtain spectrum information (that is, the frequency point energy distribution of the spectrum, also called spectrum amplitude), and generates feature parameter sets NTFSct: 801 MHz and NTFScr: 805 MHz by using the sensed spectrum information, where NTFSct is a feature parameter set of a caller transmitted signal; the feature parameter set NTFScr is packaged in an NTFS of a caller transmitted data packet for transmitting and a caller transmitting time TIMEct: 2023 May 8 11:18:09.029 is packaged in a TIME of the data packet for transmitting, and then the caller switches to full-band frequency sweep reception; if the responder refuses to establish a communication link, the system returns a prompt message that the other party is busy, and then automatically switches to step S201.

S203: matching response: the communication responder is in a silent reception state where the CID is set to 200 and the RID is set to 100; the responder autonomously identifies the feature parameter set NTFSct of the caller transmitted signal through full-band sensing and performs matching reception, parses a received data packet to obtain packet header information, and verifies whether an RID field in the packet header information is 200 to confirm that the other party is calling itself; and at this time, the system will pop up an option for the user to choose whether to respond or hang up: in a case where the user chooses to respond, the responder parses the data packet to obtain the NTFScr field of the feature parameter set in the NTFS field, uses the same as the feature parameter set of the responder transmitted signal, also performs fast spectrum sensing on the spectra within the frequency band range [800 MHZ, 820 MHz] set by the system. The responder autonomously generates the feature parameter set NTFSrr: 803 MHz through spectrum sensing, and takes the NTFSrr as a feature parameter set of a responder received signal. After that, the responder packages the feature parameter set NTFSrr, the transmitting time TIMErt: 2023 May 8 11:18:16.201 and the wait duration WAIT: 10(s) into a data packet for transmitting. Then the responder enters step S204, otherwise, switches to step S201.

S204: state transition: the communication caller uses the known feature parameter set NTFScr for reception, and parses the received data packet to obtain the feature parameter set NTFSrr, the receiver transmitting time TIMErt and the wait duration WAIT. The two communication parties determine parameter-varying communication starting time TIMEs based on the TIMErt and the wait duration WAIT. The time can be set to the sum of the TIMErt and the WAIT, and the TIMEs is 2023 May 8 11:18:26.201. The two communication parties both take the TIMEs as the parameter-varying communication starting time of the transmitter and the receiver. This also indicates that the caller and the responder have successfully established a two-way communication link.

after the caller and the communication responder successfully establish a two-way communication link, the two communication parties start an autonomous parameter-varying communication. The receivers of the two communication parties, namely, the caller and the responder, autonomously generate a feature parameter set NTFS of a received signal of the own party at the next parameter-varying time according to the real-time state of the wireless spectrum environment, and then inform the transmitter of the other party to update a feature parameter set of a transmitted signal at the next parameter-varying time by using the NTFS.

S3: the two communication parties perform interference detection on a receiving frequency point through a receiving verification mechanism, and determine the validity of a received data packet.

Specifically, the receivers of the two communication parties monitor the current frequency point through a real-time interference detection mechanism, and at the same time, generate a new NTFS in real time every other parameter-varying duration DURr:15 s through rapid spectrum sensing, and inform the transmitter of the other party to adopt this NTFS to transmit signals at the next parameter-varying time. Under the action of potential interfering nodes, the communication caller and responder find that the operating frequency point is disrupted through a real-time interference detection module, adopt a frequency point fast search algorithm to randomly obtain an idle frequency point to replace the disrupted frequency point, and autonomously update other feature parameters of the signal to avoid interference, which significantly improves the anti-interference ability of the wireless communication system. Even if this frequency point is not interfered, this feature parameter set will be updated autonomously after one parameter-varying duration DURr, to ensure that even if an interfering party senses the frequency point information used this time, it cannot timely interfere with the subsequent communication by interfering with the parameter-varying feature parameter set used in the last communication.

After entering the autonomous parameter-varying communication stage, the two communication parties have the same status and perform the same operations. Taking the communication caller as an example, the real-time autonomous parameter-varying anti-interference process is specifically as follows:

S301: parameter-varying communication: the communication caller uses the received feature parameter set NTFSrr for transmitting and uses the feature parameter set NTFScr for receiving; validity verification is performed after each reception of the data packet; and if the verification is passed, it switches to a feature updating step, and otherwise, the two communication parties obtain the data packet through full-band frequency sweep, switching to S2.

S302: feature updating: the communication caller performs rapid spectrum sensing every other parameter-varying duration DURr, autonomously generates a feature parameter set 811 MHz at the next parameter-varying time according to the sensed spectrum information, and writes the same into a NTFS field of the data packet to inform the other communication party; and then the other communication party adopts this feature parameter set to transmit signals and then switches to a parameter-varying synchronization step.

S303: parameter-varying synchronization: a synchronous clock is used to accurately synchronize the parameter-varying transmitting and receiving times of the two communication parties, where the parameter-varying duration packaged by the own party in the transmitted data packet is DURr, and the parameter-varying duration in the received data packet parsed is DURt:30 s. It can be known that the next parameter-varying receiving time of the own party is equal to the current parameter-varying receiving time 2023 May 8 11:18:26.201 of the own party plus the parameter-varying duration DURr=2023 May 8 11:18:41.201 in the transmitted data packet; and the next parameter-varying transmitting time of the own party is equal to the current parameter-varying transmitting time 2023 May 8 11:18:26.201 of the own party plus the parameter-varying duration DURt=2023 May 8 11:18:56.201 in the received data packet parsed. In this way, the two communication parties can perform synchronous parameter variation at the same parameter-varying time.

S304: synchronous correction: the two communication parties determine according to the error of the parameter-varying times of the two parties whether to lock a GPS signal again to correct the synchronous clocks to improve the synchronization rate.

The specific process is as follows: a parameter-varying time TIME field is added in the data packet for saving the parameter-varying transmitting time of the own party and transmitting the same to the other party, and after successfully receiving the corresponding data packet, the other party will record the current receiving time and compare the same with the parameter-varying transmitting time of the other party. That is, the synchronous clock error is equal to the parameter-varying transmitting time 2023 May 8 11:18:26.201 of the other party minus the receiving time 2023 May 8 11:18:26.389 of the corresponding data packet. When the synchronous clock error is greater than the preset threshold, the GPS signal will be locked and the GPS clock is used to correct and synchronize the synchronous clocks. The setting of the preset threshold depends on the software and hardware conditions and the operating environment of the autonomous parameter-varying communication system.

The caller and the responder adopt the above communication method for communication.

In addition, in this embodiment, the modulation mode, the waveform, the IQ sampling rate, the transmitting gain and the receiving gain are set, and the present method is tested comparatively with methods of the same type. The test process is performed 1000 times, and 564 data packets are transmitted and received each time. The specific results are shown in Table 1.

TABLE 1

Comparison of performance of autonomous parameter-varying communication synchronization methods with and without external clock

| | Without external clock | With external clock |
|---|---|---|
| Modulation mode | QPSK | |
| Waveform | Root raised cosine | |
| IQ sampling rate (Hz) | 200k | |
| Transmitting gain (dB) | 10 | |
| Receiving gain (dB) | 10 | |
| Autonomous parameter-varying synchronization error (ms) | 854 | 265 |
| Whether errors are accumulated | Yes | No |
| Total number of transmitted packets | 564000 | |
| Total number of lost packets | 12972 | 1362 |
| Packet loss rate | 2.3% | 0.24% |

As shown in Table 1, it can be seen from the experimental results that the autonomous parameter-varying synchronization error significantly decreases, and the packet loss rate is significantly reduced. Compared with the scheme without the external clock, the synchronization scheme with the external clock has significant advantages, which greatly improves the anti-inference ability of the parameter-varying communication system and enhances the transmission reliability of communication.

The embodiments of the present invention further provide an autonomous parameter-varying communication synchronization system based on an external clock, including a local time synchronization module, a two-way communication link establishing module, a parameter-varying transmitting and receiving module, an interference detecting module, a clock correcting or maintaining module and a computer program executable on a processor.

Figure 3:
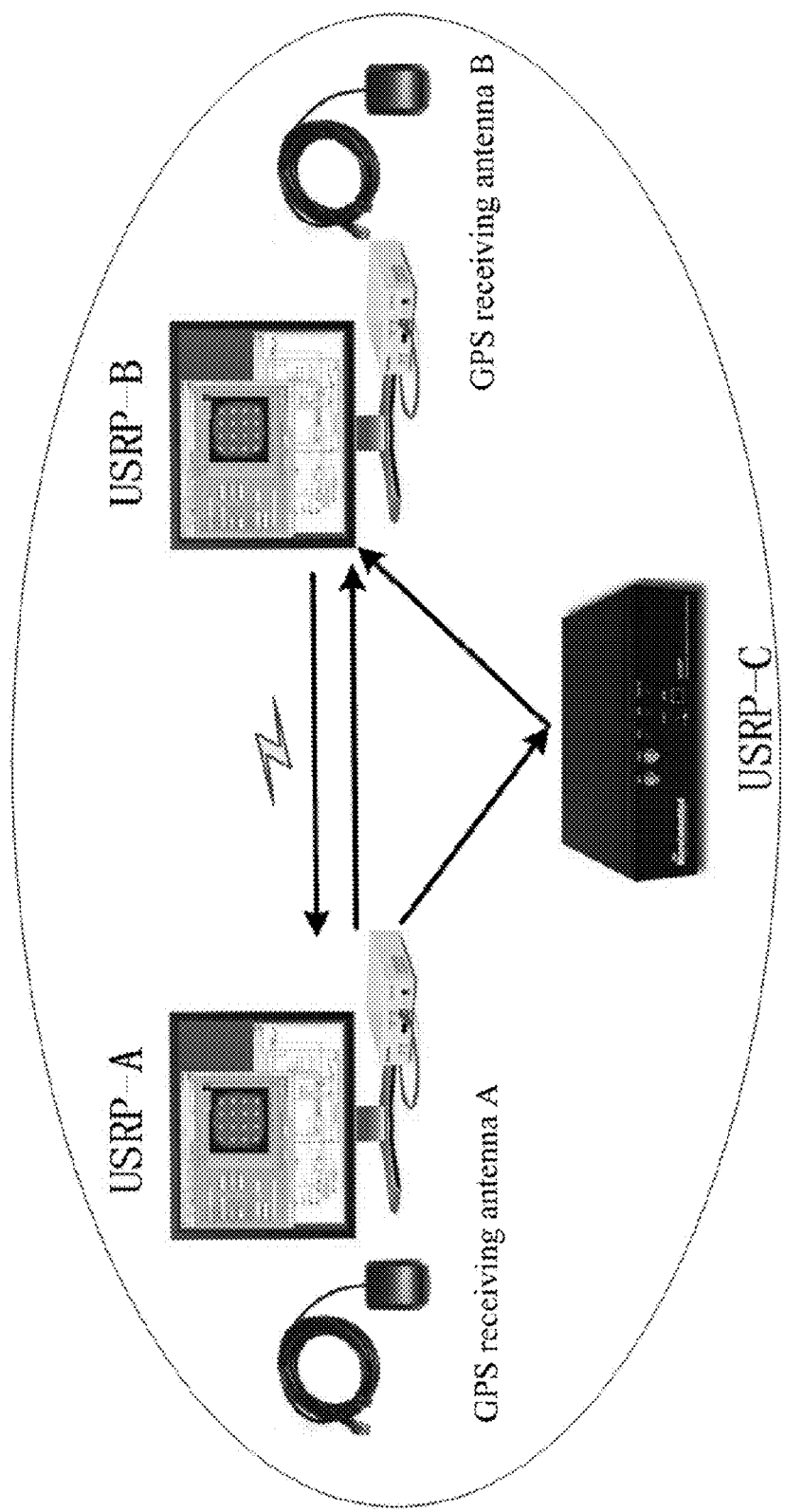
FIG. 3 is a schematic diagram of structural composition of the system of according to the present invention.

As shown in FIG. 3, a wireless communication system composed of a plurality of transmitting nodes, receiving nodes and potential interference nodes is built by means of software radio equipment USRP-2920 and LabVIEW software. The system is fully distributed, that is, the system is composed of a series of communication nodes which can be moved at will and the nodes are dynamically and freely distributed. There is no control center in the system, and all nodes have equal status. Autonomous link establishment and autonomous parameter-varying communication can be performed anytime, anywhere without any other pre-established network facilities. The system consists of communication nodes (USRP-A is the communication responder and USRP-B is the communication caller), each of which has transmitting and receiving abilities, and can be used as a transmitting node or a receiving node. A GPS receiving signal antenna A and a GPS receiving signal antenna B respectively serve as external clock signal receivers of USRP-A and USRP-B. USRP-C serves as an interference node.

It should be noted that the various modules of the system correspond to the specific steps of the method provided by the embodiment of the present invention, and have corresponding functional modules and beneficial effects for performing the method. For technical details not described in this embodiment, reference can be made to the method provided by the embodiment of the present invention.

The embodiments of the present invention further provide an electronic device, including a memory, a processor, and a computer program stored in the memory and executable on the processor. It should be noted that the electronic device corresponds to the specific steps of the method provided by the embodiment of the present invention, and has corresponding functional modules and beneficial effects for performing the method. For technical details not described in this embodiment, reference can be made to the method provided by the embodiment of the present invention.

The embodiments of the present invention further provide a computer-readable storage medium storing a computer program. It should be noted that the storage medium corresponds to the specific steps of the method provided by the embodiment of the present invention, and has corresponding functional modules and beneficial effects for performing the method. For technical details not described in this embodiment, reference can be made to the method provided by the embodiment of the present invention.

By adopting the above technical solutions, compared with the prior art, the present invention has the following beneficial effects:

the parameter-varying communication synchronization method based on an external clock source provided by the present invention improves the anti-interference capability of a wireless communication system for nodes through spectrum sensing technology and real-time generation and autonomous updating of signal feature parameter sets, and also solves the synchronization problem in a parameter-varying communication by introducing an external clock source and providing synchronous clocks with high precision and high stability. As a result, the problem of high packet loss rate caused by the error of parameter-varying times of two communication parties when the two communication parties vary the parameters based on local clocks is effectively solved, and the reliability of the wireless communication system is significantly improved.

The above embodiments are only for illustrating the technical ideas of the present invention and cannot limit the protection scope of the present invention in this way. Any changes made to the technical solutions based on the technical ideas proposed by the present invention will fall within the protection scope of the present invention.

What is claimed is:

1. An autonomous parameter-varying communication synchronization method in a wireless communication system having a plurality of communication nodes based on an external clock, comprising the following steps:

S1: obtaining, by a first party and a second party, a signal of a common external clock source, and determining, based on the signal, a first device timestamp of the first party when operating as a caller and determining, based on the signal, a second device timestamp of the second party when operating as a responder to synchronize a first local clock of the first party and a second local clock of the second party, wherein each of the first party and the second party comprises a respective one of the plurality communication nodes and communicate with each other as the caller or as the responder;

S2: based on the first local clock and the second local clock, autonomously establishing, at the first party with the second party or at the second party with the first party, a two-way communication link, further comprising:

S201: autonomously generating, when operating as the caller of the first party, feature parameter sets including NTFSct and NTFScr through spectrum sensing, wherein the feature parameter set NTFSct is a feature parameter set of a caller transmitted signal, packaging the feature parameter set NTFScr and transmitting time TIMEct into a first data packet, and transmitting the first data packet;

S202: autonomously identifying, when operating as the responder of the second party, the feature parameter set NTFSct through spectrum sensing, receiving the first data packet in step S201 in a matching manner, parsing the first data packet, and taking the feature parameter set NTFScr as a feature parameter set of a responder transmitted signal and a transmitted signal feature parameter set at the parameter-varying communication starting time;

autonomously generating, by the responder, a feature parameter set NTFSrr through spectrum sensing, and taking the feature parameter set NTFSrr as a feature parameter set of a responder received signal;

S203: determining, when operating as the responder, transmitted signal parameters at the parameter-varying communication starting time according to the feature parameter set NTFScr, determining received signal parameters at the parameter-varying communication starting time according to the feature parameter set NTFSrr, and packaging the feature parameter set NTFSrr, a transmitting time TIMErt and a wait duration WAIT into a second data packet for transmitting, so that the second data packet is received and parsed, by the caller according to the feature parameter set NTFScr;

S204: determining, when operating as the caller, transmitted signal parameters at the parameter-varying communication starting time according to the feature parameter set NTFSrr; and S205: determining, at the first party or at the second party, the parameter-varying communication starting time TIMEs according to the transmitting time TIMErt and the wait duration WAIT, the starting time TIMEs being a sum of the transmitting time TIMErt and the wait duration WAIT, and taking the starting time TIMEs as the parameter-varying communication starting time of a transmitter and a receiver;

S3: performing parameter-varying transmitting when operating as the caller, at the first party based on the first lock clock and performing parameter-varying receiving when operating as the responder at the second party based on the second local clock;

S4: performing, as the responder of the second party, interference detection on a receiving frequency point through a receiving verification mechanism, and determining the validity of a received data packet;

S5: calculating, as the second party, a difference value between a local receiving time of the second party and a parameter-varying transmitting time of the first party, comparing the difference value with a preset threshold, and if the difference value is greater than the preset threshold, correcting the first local clock of the first party as the caller or the second local clock of the second party as the responder according to the external clock signal, and if the difference value is less than the preset threshold, maintaining the first local clock of the first party as the caller or the second local clock of the second party as the responder; and S6: returning to step S3 and performing parameter-varying communication again until actively stopping communication.

2. The autonomous parameter-varying communication synchronization method based on an external clock according to claim 1, wherein fields of a transmission data packet transmitted or received between the first party and the second party comprise: caller ID CID, responder ID RID, the parameter-varying transmitting time TIME, the wait duration WAIT, parameter-varying duration DUR, transmitted data DATA and feature parameter set NTFS;

the caller ID CID and the responder ID RID are used for verifying identities of the first party and the second party;

the parameter-varying time TIME represents a parameter-varying transmitting time and is used for correcting the first local clock of the first party and the second local clock of the second party;

the wait duration WAIT represents a link-establishing wait duration, is determined by the responder, and is used for the first party and the second party to determine a parameter-varying communication starting time;

the parameter-varying duration DUR represents a wait duration for the next parameter variation and is used for the first party and the second party—to realize synchronization of autonomous parameter-varying communication;

the transmitted data DATA represents information content to be transmitted between the first party and the second party; and the feature parameter set NTFS is used for autonomously varying signal feature parameters, comprising feature parameters of frequency point, bandwidth, waveform, and modulation mode of a signal, and freely combining the feature parameters according to requirements.

3. The autonomous parameter-varying communication synchronization method based on an external clock according to claim 1, wherein in step S3, the specific steps of performing parameter-varying transmitting by the first party and performing parameter-varying receiving by the second party are:

S301: packaging, by the first party, a current parameter-varying time of the transmitter of the first party, the parameter-varying duration of the receiver and the feature parameter set of the received signal into a data packet for transmitting, for use by the first party and the second party in parameter variation;

S302: for parameter-varying communication, dynamically updating the feature parameter set NTFS for autonomously varying parameters, wherein the parameters of the caller transmitted signal and the parameters of the responder received signal at the parameter-varying communication starting time are the feature parameter set NTFSrr generated in the link establishing process, and the parameters of the caller received signal and the parameters of the responder transmitted signal at the parameter-varying communication starting time are the feature parameter set NTFScr generated in the link establishing process; autonomously generating, by the second party, a received signal feature parameter set NTFS of the second party at a next parameter-varying time through spectrum sensing, updating, by the first [party, a transmitted signal feature parameter set at the next parameter-varying time according to the feature parameter set NTFS, and converting, by the second party, system parameters based on the signal feature parameter set;

S303: for an $i^{th}$ transmitter parameter variation by the first party, where i=0,1,2, . . . , N, recording, by the transmitter of the first party, the current parameter-varying time as TIMEt (i); calculating the next parameter-varying time of the transmitter of the first party according to the parameter-varying duration DURt (i) in the received data packet, with the specific equation:

$$TIMEt(i+1) = TIMEt(i) + DURt(i),$$

wherein TIMEt(0) indicates the parameter-varying communication starting time of the transmitter of the own party, and the value is the starting time TIMEs in step S205;

for the $j^{th}$ receiver parameter variation by the second party, where j=0,1,2, . . . , N, recording, by the receiver of the second party, the current parameter-varying time as TIMEr(j); and calculating the next parameter-varying time of the receiver of the second party according to the parameter-varying duration DURr(j) in the transmitted data packet, with the specific equation as follows:

$$TIMEr(j+1) = TIMEr(j) + DURr(j),$$

wherein TIMEr(0) indicates the parameter-varying communication starting time of the receiver of the own party, and the value is the starting time TIMEs in step S205; and performing synchronous parameter-varying communication by the first party and the second party at the same parameter-varying time.

4. The autonomous parameter-varying communication synchronization method based on an external clock according to claim 1, wherein the specific content of step S4 is: performing receiving verification multiple times in succession according to a caller ID CID in the received data packet, that is, receiving and parsing the received data packet, and determining whether the caller ID CID in the data packet is equal to a responder ID RID set locally; if so, determining the received data packet as a valid data packet, and entering step S5; and otherwise, indicating that no valid data packets are received in all the receiving verification many times, determining that there is interference at the current receiving frequency point, and returning to step S2 to re-establish a two-way communication link.

5. The autonomous parameter-varying communication synchronization method based on an external clock according to claim 1, wherein in step S5, further comprising: recording the local receiving time of the data packet of the first party every time the receivers of the second party vary parameters, parsing the received data packet to obtain the parameter-varying transmitting time of the first party.

6. An autonomous parameter-varying communication synchronization system based on an external clock, comprising:

a plurality of communication nodes, wherein each of the communication nodes:

obtain, a signal of a common external clock source, and determine, based on the signal, a first device timestamp of a first party when operating as a caller and determine, based on the signal, a second device timestamp of the second party when operating as a responder to synchronize a first local clock of the first party and a second local clock of the second party, wherein each of the first party and the second party comprise a respective one of the communication nodes and communicate with each other;

based on the first local clock and the second local clock, autonomously establish, at the first party with the second party or at the second party with the first party, a two-way communication link, the two-way communication link establishing module further configured to:

autonomously generate, when operating as the caller of the first party, feature parameter sets including NTFSct and NTFScr through spectrum sensing, wherein the feature parameter set NTFSct is a feature parameter set of a caller transmitted signal, package the feature parameter set NTFScr and transmitting time TIMEct into a first data packet, and transmit the first data packet;

autonomously identify, a when operating as the responder of the second party, the feature parameter set NTFSct through spectrum sensing, receive the first data packet in a matching manner, parse the first data packet, and take the feature parameter set NTFScr as a feature parameter set of a responder transmitted signal and a transmitted signal feature parameter set at a parameter-varying communication starting time; autonomously generate, as the responder, a feature parameter set NTFSrr through spectrum sensing, and take the feature parameter set NTFSrr as a feature parameter set of a responder received signal;

determine, when operating as the responder, transmitted signal parameters at the parameter-varying communication starting time according to the feature parameter set NTFScr, determine received signal parameters at the parameter-varying communication starting time according to the feature parameter set NTFSrr, and package the feature parameter set NTFSrr, the transmitting time TIMErt and the wait duration WAIT into a second data packet for transmitting so that the second data packet is received and parsed, by the caller according to the feature parameter set NTFScr;

determine, when operating as the caller, transmitted signal parameters at the parameter-varying communication starting time according to the feature parameter set NTFSrr, and determining received signal parameters at the parameter-varying communication starting time according to the feature parameter set NTFScr; and determine, at the first party or at the second party, the parameter-varying communication starting time TIMEs according to the transmitting time TIMErt and the wait duration WAIT, the starting time TIMEs being a sum of the transmitting time TIMErt and the wait duration WAIT, and take the starting time TIMEs as the parameter-varying communication starting time of a transmitter and a receiver;

perform parameter-varying transmitting when operating as the caller, at the first party based on the first local clock and performing parameter-varying receiving when operating as the responder at the second party based on the second local clock;

perform, as the responder of the second party, interference detection on a receiving frequency point through a receiving verification mechanism, and determine the validity of a received data packet; and compare, as the second party, a difference value between a local receiving time of the second party and a parameter-varying transmitting time of the first party with a preset threshold, correct the first local clock of the first party as the caller or the second local clock of the second party as the responder if the difference value is greater than the preset threshold, and maintain the first local clock of the first party as the caller or the second local clock of the second party as the responder if the difference value is less than the preset threshold.

7. An electronic device comprising a memory, a processor, and a computer program stored in the memory and executable on the processor, wherein the processor configured to, when executing the computer program, implement the method according to claim 1.

8. A non-transitory computer-readable storage medium storing a computer program, wherein the computer program configured to, when executed by a processor, perform the method according to claim 1.

9. An electronic device comprising a memory, a processor, and a computer program stored in the memory and executable on the processor, wherein the processor configured to, when executing the computer program, implement the method according to claim 2.

10. An electronic device comprising a memory, a processor, and a computer program stored in the memory and executable on the processor, wherein the processor configured to, when executing the computer program, implement the method according to claim 3.

11. An electronic device comprising a memory, a processor, and a computer program stored in the memory and executable on the processor, wherein the processor configured to, when executing the computer program, implement the method according to claim 4.

12. An electronic device comprising a memory, a processor, and a computer program stored in the memory and executable on the processor, wherein the processor configured to, when executing the computer program, implement the method according to claim 5.

13. A non-transitory computer-readable storage medium storing a computer program, wherein the computer program configured to, when executed by a processor, perform the method according to claim 2.

14. A non-transitory computer-readable storage medium storing a computer program, wherein the computer program configured to, when executed by a processor, perform the method according to claim 3.

15. A non-transitory computer-readable storage medium storing a computer program, wherein the computer program configured to, when executed by a processor, perform the method according to claim 4.

16. A non-transitory computer-readable storage medium storing a computer program, wherein the computer program configured to, when executed by a processor, perform the method according to claim 5.

\* \* \* \* \*

UNITED STATES PATENT AND TRADEMARK OFFICE
CERTIFICATE OF CORRECTION

PATENT NO. : 12,316,444 B2  
APPLICATION NO. : 18/724621  
DATED : May 27, 2025  
INVENTOR(S) : Yulong Zou et al.

Page 1 of 1

It is certified that error appears in the above-identified patent and that said Letters Patent is hereby corrected as shown below:

On the Title Page

Item (71) Applicant should read: Nanjing University of Posts and Telecommunications, Jiangsu (CN)

Item (72) Inventors should read: Yulong ZOU, Jiangsu (CN); Zimu FANG, Jiangsu (CN); Zhixian LIN, Jiangsu (CN); Zhongmiao CHU, Jiangsu (CN)

Signed and Sealed this  
Twenty-second Day of July, 2025

Coke Morgan Stewart  
*Acting Director of the United States Patent and Trademark Office*